United States Patent [19]

Pauli

[11] 4,198,832
[45] Apr. 22, 1980

[54] FLEXIBLE DRIVE COUPLING

[75] Inventor: Ernest H. Pauli, Watchung, N.J.

[73] Assignee: The Hilliard Corporation, Elmira, N.Y.

[21] Appl. No.: 904,281

[22] Filed: May 9, 1978

[51] Int. Cl.² ........................... F16D 3/18; F16D 3/54
[52] U.S. Cl. ........................................... 64/9 R; 64/4
[58] Field of Search .................................. 64/9 R, 6, 4

[56] References Cited

U.S. PATENT DOCUMENTS

| | | | |
|---|---|---|---|
| 1,740,617 | 12/1929 | Morgan | 64/9 R |
| 1,759,338 | 5/1930 | Allen | 64/9 R |
| 2,699,656 | 1/1955 | Anderson | 64/9 R |
| 2,918,809 | 12/1959 | Miller | 64/9 R |
| 3,132,494 | 5/1964 | Hoffer | 64/9 R |
| 3,757,535 | 9/1973 | Stein | 64/9 R |
| 3,889,489 | 6/1975 | Casey | 64/9 R |
| 3,981,158 | 9/1976 | Watson | 64/9 R |

*Primary Examiner*—Ronald H. Lazarus
*Assistant Examiner*—R. C. Turner
*Attorney, Agent, or Firm*—Melford F. Tietze

[57] ABSTRACT

An improved flexible drive coupling is provided in which a driver and driven mechanisms are in adjacent housings that are fixedly connected by a shroud through which the drive coupling extends. The driver and driven gear hubs, respectively, are interconnected through a flexible spacer member having corresponding meshing gear elements wherein the spacer and at least one of said gear hubs have longitudinally extending, aligning lines which are slideably engageable when the gear elements of said spacer and hub are in spaced-apart relation to maintain the gear elements in meshing alignment where said respective housings and shroud are moved longitudinally toward each other during assembly. Thus external access is provided for positioning said gear elements in meshing alignment before said housings and shroud are brought into final mating position.

5 Claims, 6 Drawing Figures

FLEXIBLE DRIVE COUPLING

BACKGROUND OF THE INVENTION

Flexible couplings are well known devices used for providing a driving connection between power sources such as a motor with mechanisms to be driven such as a pump or a gear reduction unit and like systems. Such drive couplings have the capability of accommodating reasonable degrees of non-alignment between the shaft members that are interconnected and to permit substantially trouble free operation over extended periods of time.

One common type of flexible drive coupling utilizes gear elements that are interconnected by a flexible spacer or coupling element. This element may be a molded plastic article of sufficient rigidity to transmit driving force but having sufficient flexibility to accommodate a certiin degree of flexing during rotation. Such an element is provided with gear sections that are adapted to mesh respectively with the driving and the driven gear elements.

In such a system, the motor or power source and the driven element such as a pump are normally separate housings in adjacent or close proximity to one another and mounted in fixed positions on a predetermined fixed special relationship to one another. The gear elements mounted on shafts respectively projecting from the respective housings are in turn secured on the shafts in a fixed position in a predetermined special relationship to one another determined by the physical dimensions of the spacer or coupling element that is mounted in operative position connecting the two gear members. The fixed relationship of the two housings may be accomplished by mounting them each on a fixed bed or by interconnecting the housings by a structural mounting frame. In some instances, one of the housings may be rigidly supported on a base and the other housing supported thereon by the structural mounting frame.

In drive assemblies of this kind, problems have arisen as a result of the exposed drive coupling elements. In many instances, for example, the drive assembly may be utilized in an environment characterized by the presence of dust or other particles that might be injurious to the interconnected drive coupling or where there may be water or other liquids present which could have a detrimental effect if permitted to come into contact with the coupling elements. A further aspect of the exposure to the surroundings of such drive elements arises from the more recently developed stringent standards of the Occupational Safety and Health Administration (OSHA) under which such exposed power transmission mechanisms are considered to be a potential hazard to workers. Unless properly protected such moving elements could cause injury should the worker accidentally come into contact with it.

A relatively obvious solution to these problems is to provide an enclosure or a shroud member surrounding the rotating elements projecting between the housings of the motor and mechanism that is driven thereby. The problem with such a solution however, is that such complete enclosure of the drive coupling elements prevents access to the elements while the housings and the intervening surrounding shroud member are being assembled. Such access is necessary and is conventionally relied upon to place the engaging elements of the coupling in aligned and engaging position as the assembly is completed. Thus the gears are usually designed so that they come into meshing engagement as the elements of the assembly are brought longitudinally toward one another during assembly. The attempts of using surrounding shroud elements such as above have resulted in requiring that this aligning adjustment be done in a "blind" manner and essentially with no external access as the parts are brought together. As a result the assembling of the parts is extremely laborious and time consuming and generally not satisfactory for practical purposes. One must consider that many such power assemblies are manufactured in substantial quantities on a production basis. The obstacles that the above construction introduces are readily apparent.

The provision of an opening or openings in the shroud which would permit external access to the coupling elements during assembly is of course not satisfactory because this defeats the very purpose of the shroud.

OBJECTS AND BRIEF SUMMARY OF THE INVENTION

Accordingly, it is an object of this invention to provide in power transmission assemblies, including spaced housings having protruding driver and driven shafts, respectively, flexible coupling means and a protective shroud element interconnecting the housings and enclosing said shafts and coupling means, an improvement comprising aligning means which will register in operative alignment of said coupling means when said components are in spaced relation prior to their being secured together.

It is a further object of the invention to provide such power transmission assemblies wherein the coupling comprises gear elements mounted respectively on said shafts operatively interconnected by a spacer member carrying longitude and longitudinally spaced gear portions receivable in meshing engagement with said gear elements when said housings are assembled in which said aligning means comprise axially projecting elements slideably engageable when at least one of said gear elements and the corresponding gear portion of the spacer member are in axially spaced relation and which is thereby operative to hold said corresponding gear members in meshing alignment as they are moved axially into engagement.

It is a still further object of the invention to provide an improved coupling construction for such power transmission assemblies in which the axially projecting aligning means are tapered to facilitate engagement as said gear members are moved axially toward one another. It is another object of the invention to provide such a drive coupling construction in which the driver and driven gear elements comprise hubs having confronting recessed faces containing radially, inwardly extending gear teeth and said coupling means comprises a cylindrical element with outer circumferential, mating gear teeth at its opposite ends for engagement with the recessed teeth of said hub members and in which at least one of said hub members has an axially protruding cylindrical stud portion having circumferentially disposed teeth spaced radially inwardly and in confronting relationship to said inwardly extending gear teeth, and in which said coupling connector has an inner cylindrical bore with radially projecting teeth adapted to be received on said stud member in meshing alignment with the teeth thereon when said circumferential gear element or said connector member and the inwardly projecting hub gear elements are in meshing alignment.

A still further object of the invention is to provide such a drive coupling wherein said connector-coupling member is a flexible, molded plastic element adapted to flex during rotation to accommodate typical degrees of misalignment between the interconnected shaft members.

It is a still further object of the invention to provide in the recessed faces of said hub elements outwardly tapered walls forming the profile of said gear teeth such that the axial reception of said connector element when the respective gears of the hub and the element move into meshing position cause radial compression and thus enhancing the compressive engagement of these elements.

BRIEF DESCRIPTION OF THE DRAWINGS

An advantageous embodiment of the invention is described here and below in connection with the accompanying drawings in which.

DESCRIPTION OF A PREFERRED EMBODIMENT

Figure 1:
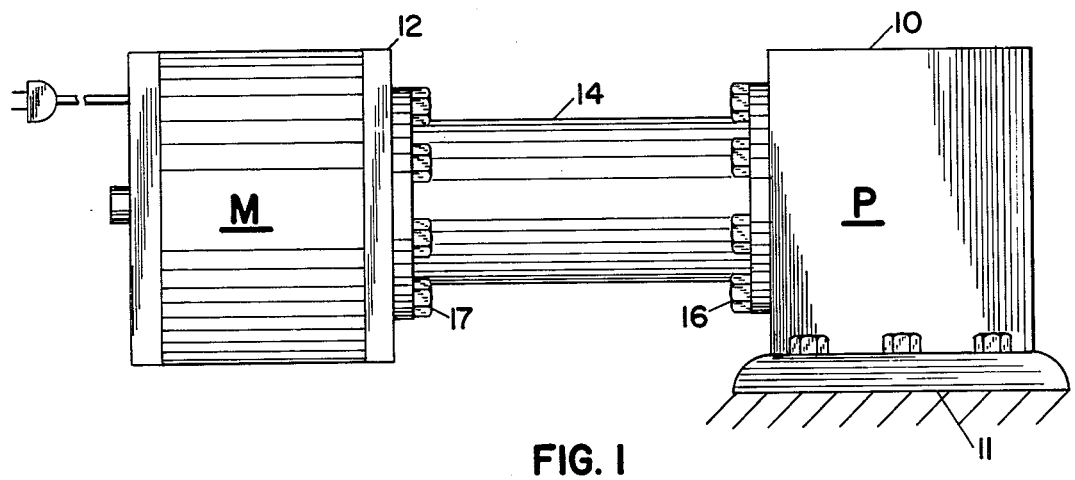
FIG. 1 is a reduced scale illustration of a pump and motor supported on the pump housing by an interconnecting mounting shroud having a flexible drive coupling therein in accordance with the invention.

Referring to FIG. 1 a power driven mechanism such as a pump is shown that 10 is rigidly fastened to a fixed base 11. A motor housing shown at 12 is mounted on the pump housing 10 through a structural supporting member in the form of a cylindrical shroud 14 bolted respectively to the pump and motor housings by bolts shown at 16 and 17. The shroud serves in addition to supporting the motor in fixed relationship to the pump also as a protective covering completely enclosing the intervening externally projecting portions of the respective shaft elements and the connecting drive coupling means as will be herein after described.

Figure 2:
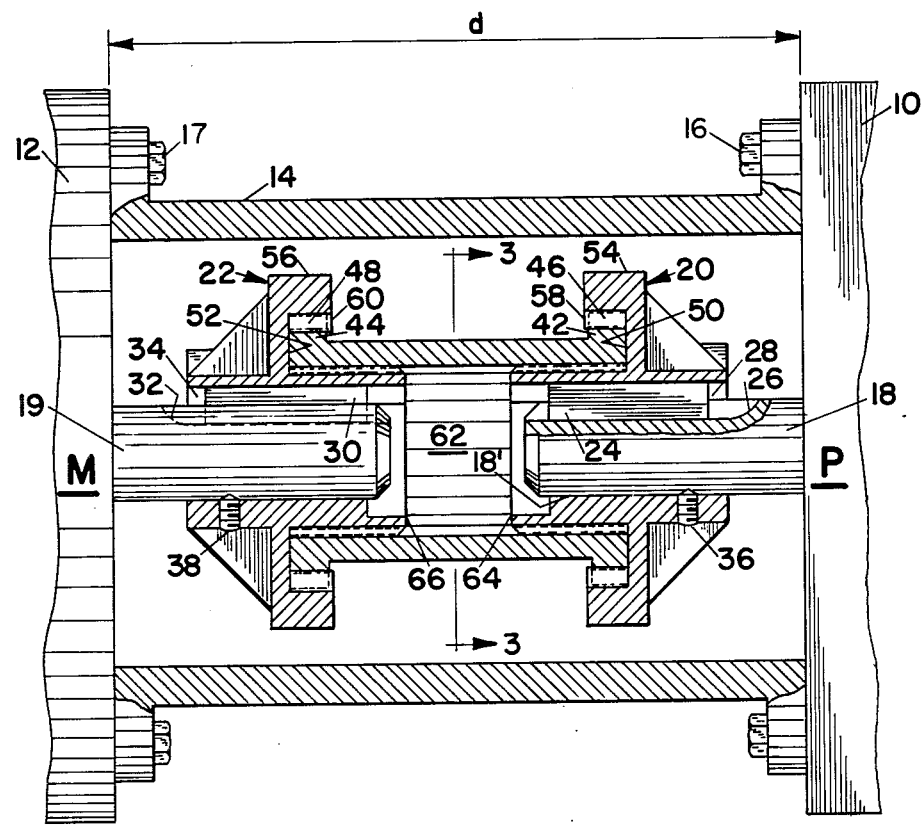
FIG. 2 is an enlarged partial sectional view of the embodiment shown in FIG. 1.

Referring to FIG. 2 the shroud 14 has been sectioned to show in an enlarged view the internal construction of the drive couplings. The projecting pump shaft is shown as 18 which is disposed in confronting relationship to the projecting end of motor shaft 19. The gear hubs 20 and 22 are mounted respectively on the shafts 18 and 19. A key member 24 received in a keyway 26 and slot 28 in the pump shaft and gear hub 20 respectively provides tortional power transmitting connection between the hub and shaft. In like manner a key 30, and a keyway 32 in the motor shaft 19 and a slot 34 of the gear hub 22 provides the driving connection for the motor driven gear hub. The gear hubs 20 and 22 are mounted on their respective shafts and secured and fixed special relationship thereon by means of locking screws 36 and 38 respectively. Extending between the two gear hubs and forming a flexible driving connection there between is a cylindrical spacer 40. The spacer is advantageously made of a flexible molded plastic material such as polyethylene or a polyester and designed to permit rotational twisting to a limited extent in order to accommadate a certain degree of misalignment between the opposing shaft members as is understood in the art. At the opposite ends of the spacer are cylindrical flanges 42 and 44 respectively carrying peripheral gear teeth elements 46 and 48. The flanges 42 and 44 are received within recesses 50 and 52 confronting faces of the opposite gear slides hubs. The outer peripheral walls 54 and 56 of the hubs are provided with gear teeth 58 and 60 respectively facing inwardly and adapted to receive the gear teeth 46 and 48 of the spacer member in meshing engagements. It would be understood that the meshing gear elements of the hub and connector 40 extend in a line parallel to the axis of the shaft elements so that the gears upon being appropriately aligned into meshing relations may be brought into meshing engagement by simple longitudinal movement toward one another.

The cylindrical connector 40 has a central bore 62 which is received at its opposite ends on the projecting central stud members 64 and 66 of the gear hubs 20 and 22 respectively.

Figure 4:
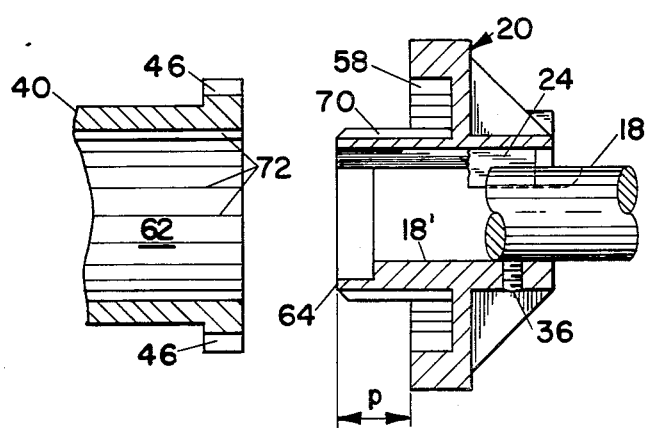
FIG. 4 is a transverse sectional view along the line 4—4 in FIG. 3.

Referring to FIG. 4, the spacer 40 and gear hub 20 are shown in separated position and afford better illustration of the manner in which these elements are adapted to be engaged. It will be seen that the center stud 64 surrounds and forms an extension of the shaft bore 18' in which the pump shaft 18 is received. Along the outside peripheral wall of the stud are formed radially projecting and longitudinally extending serrations or gear elements 70. These gear elements are of such a configuration as to correspond with similar internally formed longitudinally extending gear elements 72 formed in the interior of the gear 62 of the connector 40. In assembly as will hereinafter be more fully described the gear elements 70 and 72 are adapted to be engaged as the connector 40 is inserted slightly over the extreme end of the stud 64, thus fixing the angular orientation of the connector such that the peripheral teeth 46 are in precise meshing alignment with the gear hub teeth 58. As further longitudinal insertion of the stud member proceeds, the gear elements of 70 and 72 slide over one another while maintaining the proper meshing alignment of the connector 40 until the gear teeth 46 and 58 have been brought completely into operating engagement. The arrows shown at P indicate the longitudinal distance provided at which the angular orientation of the connector relative to the gear hub is fixed at the time these two elements are brought into initial engagement. It illustrates the spacing between these two members at which the meshing alignment of the connector and gear hub are fixed. The crest of the gear teeth elements 70 at the outer end of the stud 64 preferably taper or chamfer inwardly slightly to facilitate the insertion of the end of the stud into the connector bore 62 and to bring these members into proper engaging slideable position at this time.

Figure 3:
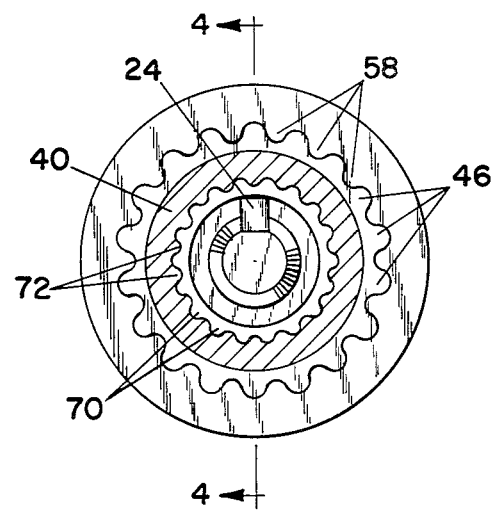
FIG. 3 is a transverse, partial sectional view along the line 3—3 in FIG. 2 showing a gear hub and connector member of the drive coupling.

The configuration of the gear elements 46 and 58 and of the meshing gear elements 70 and 72 may be more easily observed by referring to FIG. 3 of the drawings which is a cross sectional view looking directly at the gear elements in profile.

Figure 5:
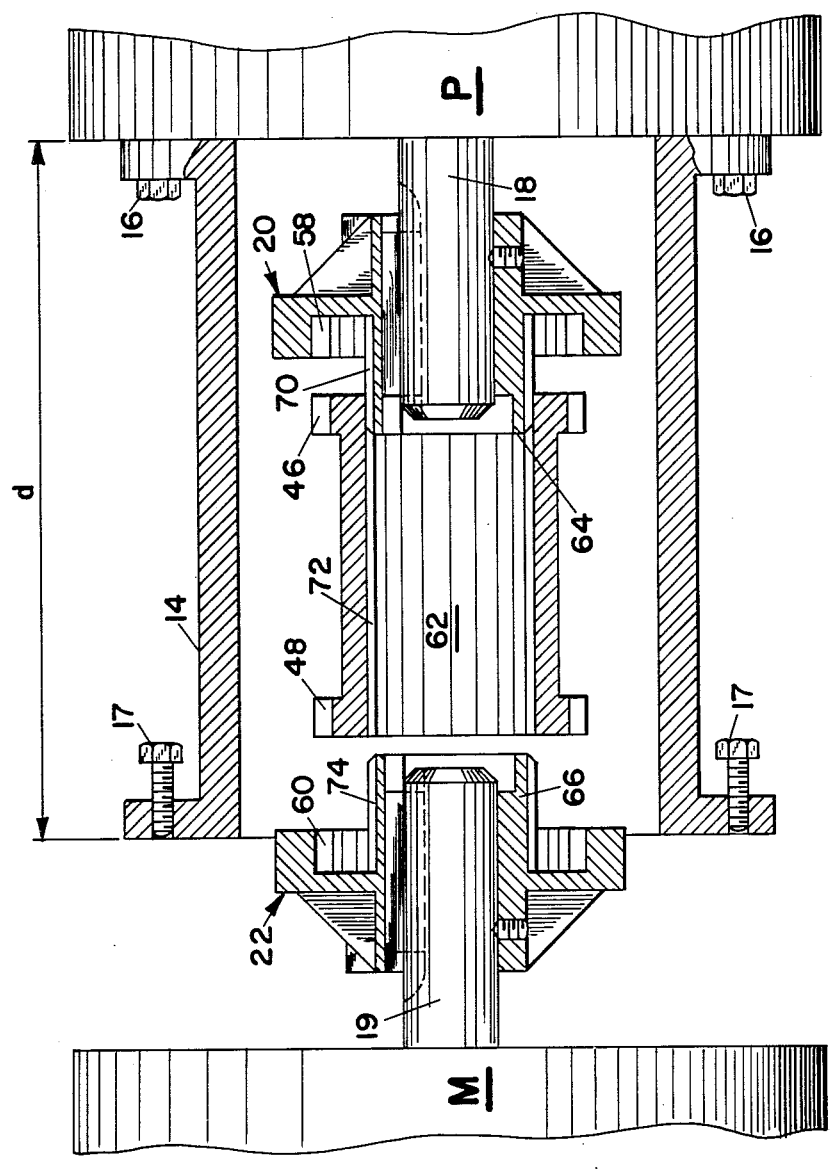
FIG. 5 is an exploded partial sectional view of the assembly shown in FIG. 2 showing the drive coupling elements during assembly and just prior to mounting engagement.

Referring to FIG. 5, the respective elements hereinabove described comprising the power transmission assembly are shown in an exploded view with the parts partially closely separated to better illustrate the manner in which the assembly is brought into final assembled position.

Referring to this view, it is first of all to be noted that the gear hub 22, shown in position just prior to insertion in the bore 62 of the spacer element 40, is constructed substantially identically to the gear hub 20. Thus, for example, the central stud member 66 which provides an extension of the bore 19' which receives the motor drive shaft 19 has around its outer circumference a series of longitudinally extended serrations or gear teeth elements 74 of substantially identical configuration to those of the teeth 70. Such gear elements are, of course, also adapted to be inserted and be received in meshing engagement with longitudinally extending identical gear element 72 of the spacer member 40. Having now described the structural features of the construction, the following will serve to better understand the manner in which the advantages of the invention are realized in the assembling of the respective components of the structure. As seen in FIG. 5, one of the gear hub elements is first mounted on its shaft in this case as illustrated by the mounting of gear hub 20 and on the shaft 18 of the pump housing. The desired longitudinal positioning of the gear hub is selected and the gear hub fixed in such position by tightening the locking screw 36. Although the sequence is not necessarily critical, normally the spacer number 40 is most advantageously placed in position by sliding it over the end of the stud member 64 sufficiently that it will be retained thereon. The shroud member 14 then may be conveniently applied to the housing of the pump by fastening screws 16.

The motor unit is then prepared by mounting the gear hub 22 on the motor drive shaft 19 in its proper longitudinal position. Such position as that of hub 20 are determined by taking into account the length of spacer member 40 and the shroud 14 so that the motor housing will be in flush engagement with the distal end of partially mounted shroud 14 when the gear hubs 20 and 22 and the connector member 40 have been moved longitudinally into a final operative position as shown in FIG. 2.

When the gear hub 22 has been properly mounted and fixed on the motor drive shaft the assembly then may be brought into confrontation with the distal opening of the shroud 14 and the assembly moved inwardly to bring the end of the stud portion 66 of the gear hub 22 into proximate relationship with the end of the bore 62 of the connecting member assembly. It will be noted at this point as shown in FIG. 5 that there is space available between the distal end of the shroud 14 and the motor housing to allow access to the drive shaft or the gear hub 22 to permit it to be rotated to the desired extent to bring the gear elements 74 and 72 into alignment. When this has been done the slight further inward motion will bring these elements into engagement and at that point fix the angular orientation respectively of all of the elements including the gear hubs 20 and 22 and the connector 40. Subsequent lateral movement then may be imparted to the assembly until the motor housing has been brought completely into engagement with the outer end of the shroud and the housing then secured by insertion and tightening of the bolts 17 as seen in FIG. 2. It can now easily be appreciated that in this assembling the drive coupling elements are maintained in fixed angular orientation so that the gears will finally come into precise meshing engagement when the final assembly has been completed.

Figure 6:
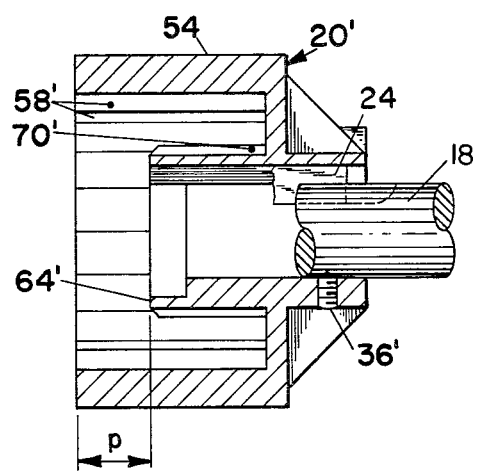
FIG. 6 illustrates an alternative embodiment of the gear hub with a modified aligning means.

A modification of the structural features above is shown in FIG. 6. This figure illustrates an alternative construction of the gear hub members as shown in a modified gear hub referred to at 20'. In this embodiment, the outer peripheral wall 54' of the hub projects forwardly of the stud member 64' by a distance P corresponding to that shown on in FIG. 4. This distance as described previously represents the separation that is afforded at the time initial contact of the spacer member 40 is made and which because of the engagement of the corresponding gear elements provides a fixed angular orientation of these parts that is maintained during any further movement of these elements toward one another. In the alternative embodiment, the gear elements shown at 46 in FIG. 4 would first make contact with the outer edges of the gear element 58' in FIG. 6. The outer surfaces of the gear 58' likewise would desirably be chamfered to facilitate the entry of these two elements into initial contact. The alignment of these gear elements fixes the corresponding meshing alignment of the internal gear teeth 72 of the connector element and gear elements 70' formed on the stud portion 64'. A gear hub of similar configuration would be provided in place of the gear hub 22. In other respects, the assembly of the units would be accomplished in the manner above described and the advantages of the present invention would thereby also be afforded.

In the construction of the gear hub members, it is advantageous to make them also of a molded plastic material such as nylon or the like capable of providing suitable structural stability of the transmission of the desired power. In molding of such elements, it is desirable that the interior wall portions of the molded parts be tapered slightly to facilitate release from the molds since such design aspect is particularly useful in the formation of the walls defining the interior gear teeth 46 and 60 of the gear hubs 20 and 22 in the above drawings. With such a chamfer, the relative lateral movement of the gear hubs and connector member 40 causes a desired radial compression when the parts have been fully brought into seating engagement which enhances the tight fitting of the gear elements when the unit is in service.

While the present invention has been particularly described in terms of specific embodiments thereof, it will be clear that numerous modifications and departures therefrom are permissable and that the instant invention is to be construed and limited only by the scope and spirit of the claims hereto.

I claim:

1. A flexible drive coupling adapted to form a driving connection between substantially axially aligned confronting shafts, respectively, protruding from housings of a driver and a driven mechanism interconnected by a shroud detachably connecting said housings in fixed spacial relation and forming a protective enclosure surrounding said protruding shafts, said driving connection comprising a pair of gear members mounted respectively on said protruding shafts, a spacer member carrying longitudinally spaced gear portions, each of which is longitudinally receivable in meshing engagement with one of said respective gear members, and axially projecting aligning means extending between at least one end of said spacer member and its corresponding adjacent gear member and forming a sliding engagement therebetween slideably engageable in a predetermined relative angular position corresponding to meshing alignment of one of said spacer gear portions and its corresponding gear member when said corresponding gear member and spacer gear portion are in disengaged longitudinally spaced position, such that upon registering of said aligning means in a predetermined longitudinal relationship said gear portion and gear member will be maintained in alignment and merged into meshing engagement upon further axial movement toward one another.

2. A flexible drive coupling according to claim 1 wherein said aligning means comprises an annular, axially extending portion of said hub with longitudinal serrations formed therein, said annular portion being concentrically disposed relative to said circumferential gear teeth and projecting axially beyond said gear teeth, said cylindrical spacer member having an internal bore adapted to be received on said annular portion and having slideable gear-like grooves adapted to be slideably received on said serrations when said radial gear teeth of said annular portion and said spacer member are in axially spaced meshing alignment.

3. In a flexible drive coupling mechanism for connecting a driver and a driven shaft within a protective housing enclosing the exposed shaft members, the improvement comprising first and second gear hubs adjustably mounted on said respective shafts, each of said gear hubs comprising a cylindrical body having an axial shaft receiving bore, an annular recess formed in one end face of said body adapted to be in confronting relation to the corresponding end face the other of said gear hubs, said recess surrounding a central cylindrical stud partially coextensive with said shaft bore and having longitudinally extending gear elements around the outer periphery thereof, said recess being bounded by an outer circumferential wall having longitudinally extending gear elements projecting inwardly of said wall in confronting relation to the gear elements on said stud member, said stud member and its gear elements projecting longitudinally beyond the longitudinal extent of said outer wall, and a cylindrical spacer member having a central bore with longitudinal extending serrations adapted to be slideably received on the stud gear elements of said gear hubs and circumferential gear members at its opposite ends adapted to be slideably received in meshing engagement with said outer circumferential gear elements of said gear hubs.

4. A flexible drive coupling according to claim 3 wherein said gear hubs are of molded relatively rigid plastic material and said cylindrical spacer member is molded of relatively more flexible material.

5. A flexible drive coupling adapted to form a driving connection between substantially axially aligned confronting shafts, respectively, protruding from housings of a driver and a driven mechanism interconnected by a shroud detachably connecting said housings in fixed spacial relation and forming a protective enclosure surrounding said protruding shafts, said driving connection comprising a pair of hub gear members mounted in fixed, axially adjustable positions respectively on said protruding shafts, interconnected by a spacer member carrying longitudinally spaced gear portions receivable in meshing engagement with said respective gear members, said hubs having recessed confronting faces in which an annular wall portion has circumferentially disposed radial gear teeth whose surfaces extend axially of said hub and said spacer member comprises a cylindrical member having circular, radially projecting gear teeth at substantially each end thereof adapted to be received in said hub recesses in meshing engagement with the teeth therein and axially projecting aligning means extending between at least one end of said spacer member and its corresponding adjacent gear member slideably engageable in a predetermined relative angular position corresponding to meshing alignment of one of said spacer gear portions and its corresponding gear member such that upon registering of said aligning means in a predetermined longitudinal relationship said gear portion and gear element will be maintained in alignment and merged into meshing engagement of upon further axial movement toward one another.

* * * * *